(12) United States Patent
Neidrich

(10) Patent No.: US 7,402,880 B2
(45) Date of Patent: Jul. 22, 2008

(54) ISOLATION LAYER FOR SEMICONDUCTOR DEVICES AND METHOD FOR FORMING THE SAME

(75) Inventor: Jason M. Neidrich, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/110,027

(22) Filed: Apr. 20, 2005

(65) Prior Publication Data

US 2006/0245036 A1    Nov. 2, 2006

(51) Int. Cl.
*H01L 29/04* (2006.01)

(52) U.S. Cl. .................................. 257/432; 257/59

(58) Field of Classification Search .................. 257/59, 257/432
See application file for complete search history.

(56) References Cited

U.S. PATENT DOCUMENTS

| | | |
|---|---|---|
| 6,282,010 B1 | 8/2001 | Sulzbach et al. |
| 6,804,039 B1 * | 10/2004 | Doan et al. ............... 359/291 |
| 2006/0087717 A1 * | 4/2006 | McGinley et al. ......... 359/291 |

* cited by examiner

*Primary Examiner*—Kiesha L Rose
(74) *Attorney, Agent, or Firm*—Dawn V. Stephens; W. James Brady, III; Frederick J. Telecky, Jr.

(57) ABSTRACT

According to one embodiment of the present invention, a semiconductor device includes a first layer of dielectric material disposed upon an upper surface of a substrate of the semiconductor device, a first layer of metal disposed upon an upper surface of the first layer of dielectric material, and a thick film anti-reflective layer having a thickness of at least about one micron disposed upon an upper surface of the first layer of metal.

25 Claims, 3 Drawing Sheets

ISOLATION LAYER FOR SEMICONDUCTOR DEVICES AND METHOD FOR FORMING THE SAME

TECHNICAL FIELD

This invention relates in general to semiconductor devices and, more particularly, to an isolation layer for semiconductor devices and a method for forming the same.

BACKGROUND

Semiconductor devices may be designed to interact with electromagnetic radiation that is incident upon a particular area of the device. One such semiconductor device is a spatial light modulator (SLM), which serves to redirect the path of incoming radiation by action of one or more accepted principles of optics, such as reflection, refraction, or diffraction. Unfortunately, in many of these devices, some incident radiation may not be redirected in the desired manner due to physical gaps, unwanted diffraction, scattering effects, or other phenomena. Such radiation may be deemed "stray radiation," which may degrade the performance of the overall system if a mechanism of absorbing the radiation is not present.

An example of a SLM whose performance may be degraded by stray radiation is a digital micro-mirror device (DMD). DMDs, which may be used in a variety of optical communication and/or projection display systems, involve an array of micro-mirrors that selectively communicate at least a portion of an optical signal or light beam by pivoting between active "on" and "off" states. To permit the micro-mirrors to pivot, each micro-mirror is attached to a hinge coupled to a CMOS substrate that controls the movement of the micro-mirrors. Unfortunately, when the micro-mirrors are in the "off" state, the CMOS substrate, which may be optically reflective, is exposed. As light passes between the micro-mirrors of the DMD, the light may then be reflected by the surface of the substrate, resulting in stray radiation that limits the contrast ratio achievable in display systems based on the DMD.

A variety of methods have been employed in an attempt to reduce the reflectivity of the CMOS substrate that makes up the substructure of DMDs and other spatial light modulators. One such method is the application of an antireflective and/or absorptive coating to certain regions of the semiconductor device which are physically located on a different plane than the surface(s) responsible for the redirection effects. These coatings, however, are limited in that they may require complicated materials and may not absorb sufficiently within the frequency range of interest to provide the best system performance. Additionally, some of these coatings require patterning over the substrate due to optical or electrical performance issues.

SUMMARY OF THE INVENTION

According to one embodiment of the present invention, a semiconductor device includes a first layer of dielectric material disposed upon an upper surface of a substrate of the semiconductor device, a first layer of metal disposed upon an upper surface of the first layer of dielectric material, and a thick film anti-reflective layer having a thickness of at least about one micron disposed upon an upper surface of the first layer of metal.

A technical advantage of some embodiments of the present invention includes a semiconductor device having a lower level of electromagnetic radiation reflected from the underlying layers. Spatial light modulators thus constructed may result in systems with improved contrast ratios when compared to systems prepared with conventional semiconductor devices. Another technical advantage of some embodiments of the present invention includes an isolation layer for semiconductor devices that may be applied using common semiconductor manufacturing materials and techniques. These materials require little in the way of special handling and help to reduce the cost of the resulting semiconductor devices. This isolation layer may serve as an optical isolation layer as well as an electrical and process isolation layer that facilitates separation between the CMOS circuitry and the superstructure of a DMD, for example. It may also enable CMOS and superstructure layout modifications.

Other technical advantages of the present invention may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and features and advantages thereof, reference is now made to the following description, taken in conjunction with the accompanying drawings, in which.

DESCRIPTION OF EXAMPLE EMBODIMENTS

In accordance with the present invention, a thick film anti-reflective layer for use in semiconductor devices and an isolation method utilizing such thick film anti-reflective layer are provided. Such a thick film anti-reflective layer may be utilized in a semiconductor device, such as a spatial light modulator, digital micro-mirror device, variable diffraction grating, liquid crystal light valve, or other semiconductor device, to reduce the effects of stray radiation on the performance of the device. An example of one such device is a digital micro-mirror device (DMD) 100, a portion of which is illustrated in FIGS. 1A and 1B.

Figure 1A:
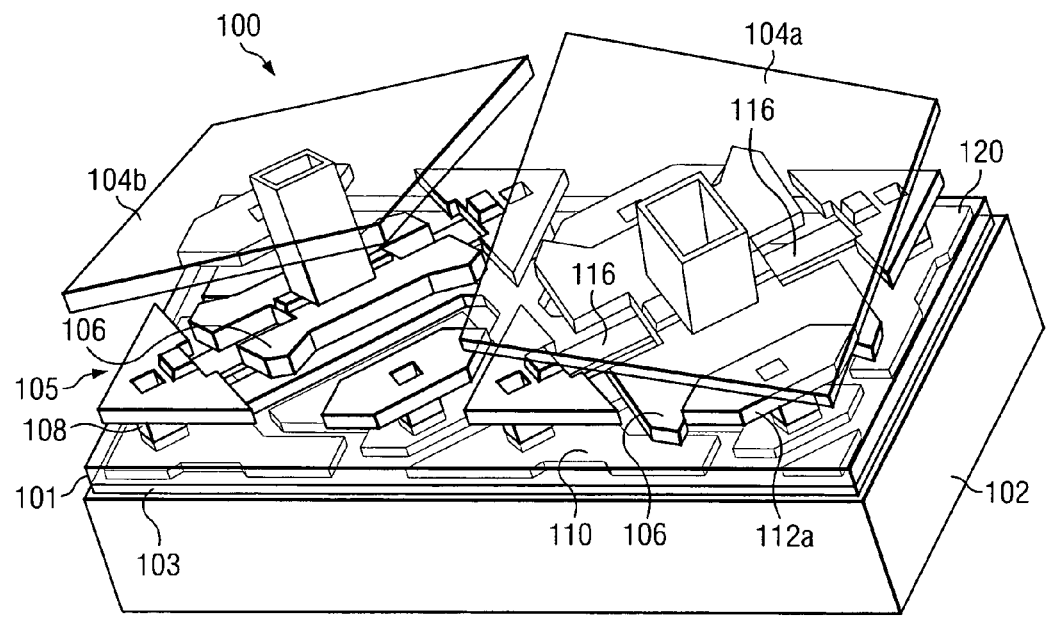
FIG. 1A is a perspective view.
Figure 1B:
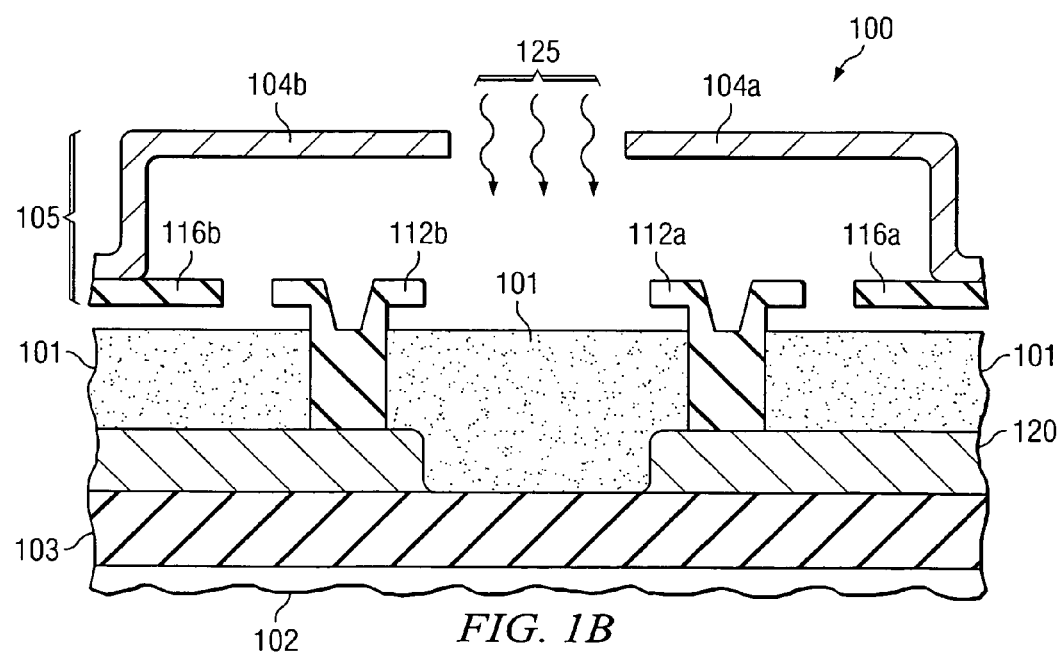
FIG. 1B is a cross-sectional view, of a portion of an example semiconductor device in accordance with a particular embodiment of the present invention.

FIG. 1A illustrates a perspective view, and FIG. 1B illustrates a partial cross-section, of a portion of digital micro-mirror device 100. In the illustrated embodiment, DMD 100 includes an array of hundreds of thousands of micro-mirrors 104 that tilt up to plus or minus twelve degrees, for example, creating an active "on" state condition or an active "off" state condition. Each micro-mirror 104 transitions between its active "on" and "off" states to selectively communicate at least a portion of an optical signal or light beam.

To permit micro-mirrors 104 to tilt, each micro-mirror 104 is attached to a respective hinge 116 mounted on a hinge post 108, and spaced by means of an air gap over a thick film anti-reflective layer 101. In this example, micro-mirrors 104 tilt in the positive or negative direction as a result of an electrostatic force between a respective electrode 112 and its corresponding micro-mirror 104 until a yoke 106 contacts conductive conduits 110. Although this example includes yoke 106, other examples may eliminate yoke 106. In those examples, micro-mirrors 104 may tilt in the positive or negative direction until micro-mirrors 104 contact a suitable mirror stop (not explicitly shown).

In this particular example, electrodes 112 and conductive conduits 110 are formed within or coupled to a metal layer 120 disposed outwardly from a dielectric layer 103. Dielectric layer 103 operates to isolate a complementary metal-oxide semiconductor (CMOS) substrate 102 from electrodes 112 and conductive conduits 110. In this particular example, CMOS substrate 102 comprises the control circuitry associated with DMD 100. The control circuitry may include any hardware, software, firmware, or combination thereof capable of at least partially contributing to the creation of the electrostatic forces between electrodes 112 and micro-mirrors 104. The control circuitry associated with CMOS substrate 102 functions to selectively transition micro-mirrors 104 between "on" state and "off" state based at least in part on data received from a processor (not explicitly shown). In one embodiment, when micro-mirrors 104 are in the "off" state, CMOS substrate 102 may be exposed because of the tilting of micro-mirrors 104. In conventional DMDs, this results in an unwanted reflection, visible between the pixels of the optical signal or image produced by the DMD.

Thus, according to the teachings of one embodiment of the invention, thick film anti-reflective layer 101 optically isolates a superstructure 105 of DMD 100 from CMOS substrate 102 and metal layer 120. In other embodiments, thick film anti-reflective layer 101 optically, electrically, and mechanically isolates superstructure 105 from CMOS substrate 102 and metal layer 120.

With multiple layers of highly reflective metals and dielectric materials comprising part of CMOS substrate 102 and metal layer 120, the surfaces of these components are typically optically reflective. To help reduce the effects of this reflectivity, thick film anti-reflective layer 101 operates as an optical absorber on the upper surface of metal layer 120. As indicated by reference numeral 125, when micro-mirrors 104 are tilted in the "off" state, electromagnetic radiation, such as visible light, may pass between micro-mirrors 104. The presence of thick film anti-reflective layer 101 taught here provides absorption and some destructive optical interference and scattering to lessen the intensity of the electromagnetic radiation passing between micro-mirrors 104 as compared to devices without thick film anti-reflective layer 101.

In one embodiment, thick film anti-reflective layer 101 is formed from a suitable anti-reflective polymer; however, thick film anti-reflective layer 101 may be formed from other suitable anti-reflective materials, such as a bottom anti-reflective coating ("barc"). In addition, thick film anti-reflective layer 101 has a thickness of at least about one micron. In a more particular embodiment of the invention, thick film anti-reflective layer 101 has a thickness of about one micron to about three microns.

Metal layer 120, which is also sometimes referred to as "Metal 3" in a DMD, is disposed upon an upper surface of dielectric layer 103, which is disposed upon an upper surface of CMOS substrate 102. In one embodiment, metal layer 120 is formed from aluminum or an aluminum alloy; however, because of the presence of thick film anti-reflective layer 101, metal layer may be formed from other suitable materials, such as copper and tungsten. Thick film anti-reflective layer 101 makes the use of these other types of materials possible because of the electrical isolation that thick film anti-reflective layer 101 may provide.

Dielectric layer 103 acts to electrically isolate "Metal 3" from CMOS substrate 102. Dielectric layer 103 may be formed from any dielectric material suitable for use in semiconductor manufacturing, such as TEOS oxide, HDP oxide, or any suitable combination of dielectrics. In addition, dielectric layer 103 may have any suitable thickness, such as approximately 10,000 angstroms, and may be formed in any suitable manner, such as deposition. Such suitable deposition techniques include, but are not limited to, sputtering, chemical vapor deposition, plasma-enhanced chemical vapor deposition, and spin-coating.

The particular structural arrangement and particular materials for metal layer 120, dielectric layer 103, and CMOS substrate 102 are presented for illustrative purposes only. A digital micro-mirror device or other semiconductor device could comprise other structures or materials of construction without deviating from the teachings of the present invention.

A method of manufacturing a semiconductor device in accordance with the teachings of one embodiment of the present invention is illustrated in FIGS. 2A through 2E. The embodiment illustrated assumes that CMOS substrate 102 has already been formed. Depending upon the type of semiconductor device being fabricated, CMOS substrate 102 may comprise a variety of different materials arranged in a variety of different structures, all falling within the teachings of the present invention.

After CMOS substrate 102 is formed, dielectric layer 103 is deposited on the upper surface of CMOS substrate 102. As discussed above, this may include any suitable dielectric material used in semiconductor processing, such as an oxide. In addition, dielectric layer 103 may be any suitable thickness; however, in one embodiment, the thickness of dielectric layer 103 is approximately 10,000 angstroms.

Metal layer 120 is then deposited on the top surface of dielectric layer 103 and may have any suitable arrangement. As described above, metal layer 120 may be formed from any suitable metal, such as aluminum, an aluminum alloy, copper, and tungsten. In addition, metal layer 120 may be formed from any suitable number of layers and may have any suitable total thickness.

Figure 2A:
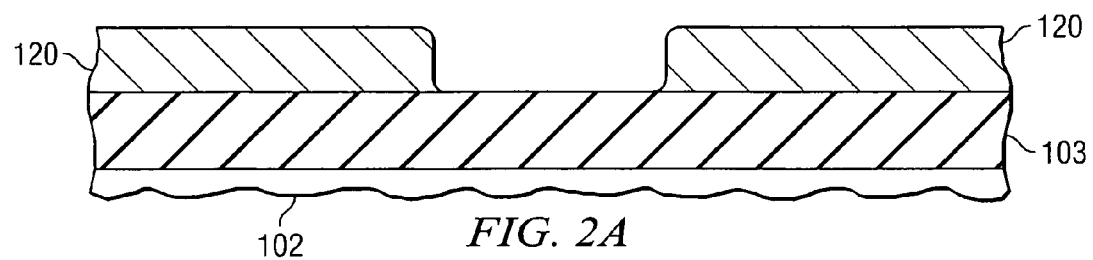
FIGS. 2A through 2E illustrate various cross-sectional views of a portion of the semiconductor device of FIG. 1 in accordance with a particular embodiment of the present invention.
Figure 2B:
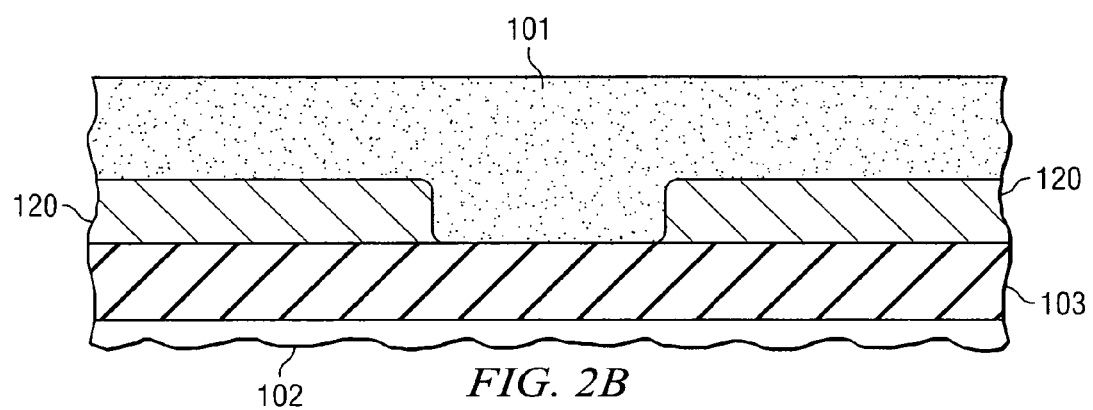

FIG. 2B illustrates thick film anti-reflective layer 101 deposited on the upper surface of metal layer 120. As described above, thick film anti-reflective layer 101 may be formed from any suitable material, such as an anti-reflective polymer or a barc having any suitable thickness, such as between one and two microns. Any suitable deposition technique used in semiconductor processing may be utilized to deposit thick film anti-reflective layer 101 on the top surface of metal layer 120.

Figure 2C:
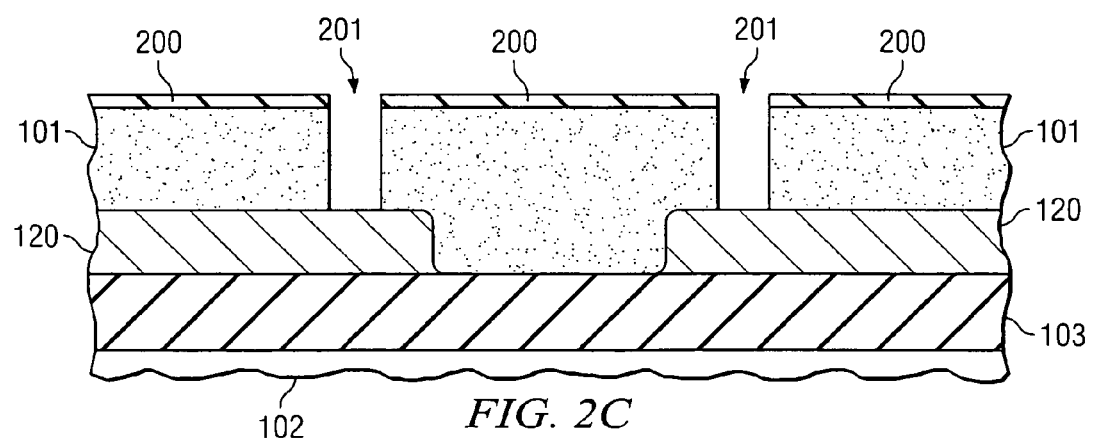

Referring to FIG. 2C, a hard mask layer 200 is deposited on the upper surface of thick film anti-reflective layer 101. Hard mask layer 200 functions as an etch stop and may be formed from a PO nitride or other suitable hard mask material. In addition, hard mask layer 200 may have any suitable thickness. Also illustrated in FIG. 2C is the removal of portions of hard mask layer 200 via a suitable photo pattern and etch technique. For example, although not illustrated, a photoresist layer may be formed outwardly from hard mask layer 200 and subsequently patterned and etched with, for example, a plasma $CF_4$ etch in order to remove the portions of the material as indicated by reference numerals 201. Then, portions of thick film anti-reflective layer 101 may be etched using any suitable etching technique, such as an $O_2$ plasma etch, to form vias 203 down to metal layer 120.

Figure 2D:
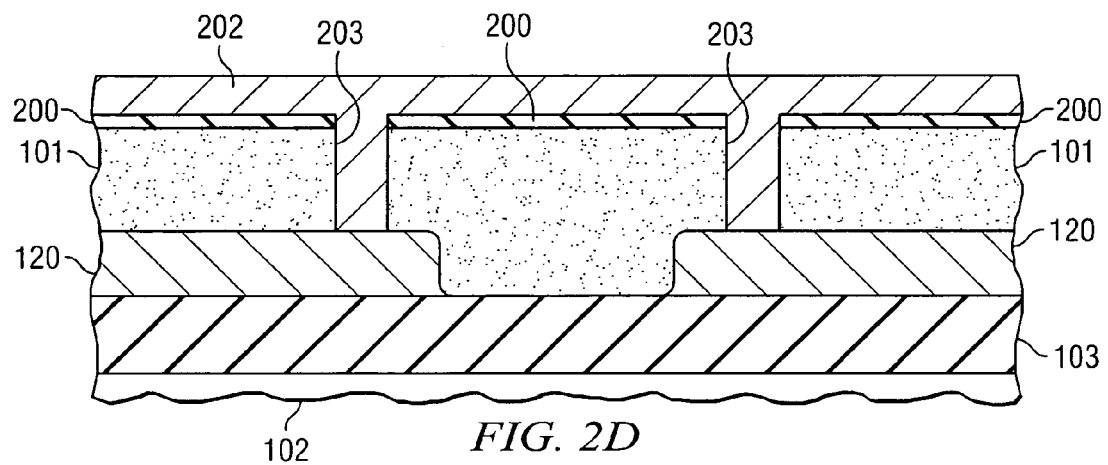

As illustrated in FIG. 2D, a metal layer 202 is deposited on the top surface of hard mask layer 200 in addition to filling the vias 203. Metal layer 202 may be any suitable material, such as copper or aluminum copper, having any suitable thickness.

In addition, metal layer 202 may be formed using any suitable process, such as electroplating.

Figure 2E:
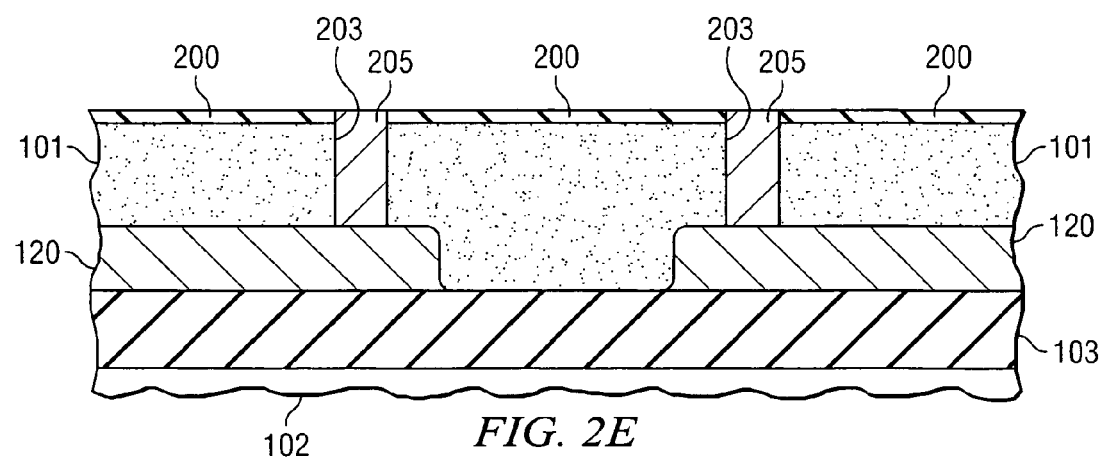

Referring to FIG. 2E, the portion of metal layer 202 on the surface of hard mask layer 200 is removed by any suitable removal techniques, such as a suitable chemical mechanical polishing technique. This then leaves the structure as illustrated in FIG. 2E in which electrode posts 205 are formed in vias 203. This chemical mechanical polishing process may or may not leave a thin layer of the hard mask layer 200 on the top surface of thick film anti-reflective layer 101. Subsequent semiconductor processing techniques well known in the art may than be utilized to complete DMD 100 by forming the superstructure 105 of DMD 100 including, without limitation, electrodes 112, hinges 116, and mirrors 104.

Thus, thick film anti-reflective layer 101 functions to optically, electrically, and mechanically isolate superstructure 105 of DMD 100 from CMOS substrate 102. The optical isolation assures that any stray light that enters between mirrors 104 do not reflect as unwanted signals. The electrical isolation may enable greater scalability and greater design flexibility by allowing different materials to be used for the Metal 3 layer as well as allowing greater layout flexibility for the Metal 3 layer. In addition, the mechanical isolation may enable new lubrication strategies and may help planarize the Metal 3 structure, which removes any sensitivity to the Metal 3 topography.

Although particular embodiments of the method and apparatus of the present invention are illustrated in the accompanying drawings and described in the foregoing detailed description, the invention is not limited to the embodiments disclosed, but is capable of numerous rearrangements, modifications, and substitutions without departing from the spirit of the invention as set forth and defined by the following claims.

What is claimed is:

1. A digital micro-mirror device, comprising:
   a first layer of dielectric material disposed upon an upper surface of a CMOS substrate;
   a first layer of metal disposed upon an upper surface of the first layer of dielectric material;
   a thick film anti-reflective layer that is not a sacrificial layer and is disposed upon an upper surface of the first layer of metal, the thick film anti-reflective layer having a thickness of at least about one micron;
   a micro-mirror disposed above the thick film anti-reflective layer; and
   an electrode having an electrode post formed in the thick film anti-reflective layer and electrically coupled to the first layer of metal, the electrode operable to apply an electrostatic force to the micro-mirror.

2. The digital micro-mirror device of claim 1, wherein the first layer of metal is formed from a material selected from the group consisting of aluminum, an aluminum alloy, copper, and tungsten.

3. An isolation method for a semiconductor device, comprising:
   disposing a first layer of dielectric material upon an upper surface of a substrate of the semiconductor device;
   disposing a first layer of metal upon an upper surface of the first layer of dielectric material; and
   disposing a thick film anti-reflective layer having a thickness of at least about one micron upon an upper surface of the first layer of metal,
   wherein the thick film anti-reflective layer is operative for optically isolating at least one of the first layer of the dielectric material and the first layer of metal from another portion of the semiconductor device.

4. The method of claim 3, wherein the semiconductor device comprises a device selected from the group consisting of a digital micro-mirror device, a variable diffraction grating, and a liquid crystal light valve.

5. The method of claim 3, wherein the first layer of metal comprises aluminum or an aluminum alloy.

6. The method of claim 3, wherein the first layer of metal is selected from the group consisting of copper and tungsten.

7. The method of claim 3, wherein the thick film anti-reflective layer comprises an anti-reflective polymer.

8. The method of claim 3, wherein the thick film anti-reflective layer comprises a bottom anti-reflective coating.

9. The method of claim 3, wherein the thick film anti-reflective layer is an electrical insulator.

10. The method of claim 3, wherein the thick film anti-reflective layer has a thickness from about one micron to about three microns.

11. The method of claim 3, further comprising an electrode post formed in the thick film anti-reflective layer.

12. The method of claim 3 further comprising disposing an etch stop layer on at least a portion of an upper surface of the thick film anti-reflective layer.

13. A semiconductor device, comprising:
    a first layer of dielectric material disposed upon an upper surface of a substrate of the semiconductor device;
    a first layer of metal disposed upon an upper surface of the first layer of dielectric material; and
    a thick film anti-reflective layer having a thickness of at least about one micron disposed upon an upper surface of the first layer of metal,
    wherein the thick film anti-reflective layer optically isolates at least one of the first layer of the dielectric material and the first layer of metal from another portion of the semiconductor device.

14. The semiconductor device of claim 13, wherein the semiconductor device comprises a device selected from the group consisting of a digital micro-mirror device, a variable diffraction grating, and a liquid crystal light valve.

15. The semiconductor device of claim 13, wherein the first layer of metal comprises aluminum or an aluminum alloy.

16. The semiconductor device of claim 13, wherein the first layer of metal is selected from the group consisting of copper and tungsten.

17. The semiconductor device of claim 13, wherein the thick film anti-reflective layer comprises an anti-reflective polymer.

18. The semiconductor device of claim 13, wherein the thick film anti-reflective layer comprises a bottom anti-reflective coating.

19. The semiconductor device of claim 13, wherein the thick film anti-reflective layer is an electrical insulator.

20. The semiconductor device of claim 13, wherein the thick film anti-reflective layer has a thickness from about one micron to about three microns.

21. The semiconductor device of claim 13, further comprising an electrode post formed in the thick film anti-reflective layer.

22. A digital micro-mirror device, comprising:
    a first layer of dielectric material disposed upon an upper surface of a CMOS substrate;
    a first layer of metal disposed upon an upper surface of the first layer of dielectric material;
    a thick film anti-reflective layer disposed upon an upper surface of the first layer of metal, the thick film anti-reflective layer having a thickness of at least about one micron;

an etch stop layer disposed on at least a portion of an upper surface of the thick film anti-reflective layer;
a micro-mirror disposed above the etch stop layer; and
an electrode having an electrode post formed in the thick film anti-reflective layer and electrically coupled to the first layer of metal, the electrode operable to apply an electrostatic force to the micro-mirror.

23. The digital micromirror device of claim 22, wherein the etch stop layer comprises a PO nitride material.

24. The semiconductor device of claim 13, further comprising an etch stop layer disposed on at least a portion of an upper surface of the thick film anti-reflective layer.

25. The semiconductor device of claim 24, wherein the etch stop layer comprises a PO nitride material.

* * * * *